(12) United States Patent
San et al.

(10) Patent No.: US 11,108,868 B2
(45) Date of Patent: Aug. 31, 2021

(54) LIVE SWITCHING OF COLLABORATIVE VIRTUAL DESKTOP SESSIONS

(71) Applicant: VMware, Inc., Palo Alto, CA (US)

(72) Inventors: Yunfei San, Beijing (CN); Yunxia Cheng, Beijing (CN); Haiou Jiang, Fremont, CA (US); Jian Song, Beijing (CN); Dong Wang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 81 days.

(21) Appl. No.: 16/246,525

(22) Filed: Jan. 13, 2019

(65) Prior Publication Data

US 2020/0228606 A1 Jul. 16, 2020

(51) Int. Cl.
*H04L 29/08* (2006.01)
*H04L 29/06* (2006.01)

(52) U.S. Cl.
CPC .......... *H04L 67/141* (2013.01); *H04L 65/403* (2013.01); *H04L 67/143* (2013.01); *H04L 67/38* (2013.01); *H04L 67/42* (2013.01)

(58) Field of Classification Search
CPC ..... H04L 67/141; H04L 65/403; H04L 67/38; H04L 67/143; H04L 67/42; H04L 65/1069; H04L 65/4015
See application file for complete search history.

(56) References Cited

U.S. PATENT DOCUMENTS

| | | | |
|---|---|---|---|
| 10,101,893 B1 | 10/2018 | van Doorn | |
| 10,341,743 B1 | 7/2019 | Tanner | |
| 10,705,690 B1* | 7/2020 | Mehta | G06F 3/0484 |
| 2004/0221010 A1 | 11/2004 | Butler | |
| 2008/0320082 A1 | 12/2008 | Kuhlke | |
| 2010/0138744 A1 | 6/2010 | Kamay | |
| 2010/0175004 A1 | 7/2010 | Deep | |
| 2011/0209064 A1 | 8/2011 | Jorgensen | |
| 2011/0224811 A1 | 9/2011 | Lauwers | |
| 2012/0110576 A1* | 5/2012 | Lin | G06F 9/50 718/1 |
| 2013/0018950 A1 | 1/2013 | Narayanan | |
| 2013/0212576 A1 | 8/2013 | Huang | |
| 2013/0238775 A1 | 9/2013 | Taguchi | |
| 2014/0068718 A1* | 3/2014 | Mureinik | G06F 21/53 726/4 |
| 2014/0229934 A1 | 8/2014 | Larkin | |
| 2015/0113528 A1 | 4/2015 | Kim | |
| 2015/0134737 A1 | 5/2015 | Albrecht | |
| 2016/0024358 A1 | 1/2016 | Zambova | |
| 2016/0127432 A1* | 5/2016 | Privat | H04L 65/403 709/204 |
| 2016/0247123 A1 | 8/2016 | Holst | |

(Continued)

*Primary Examiner* — Soe Hlaing

(57) ABSTRACT

A system is provided for switching a VDI collaborative session where multiple clients are collaboratively accessing a first virtual desktop to a second virtual desktop belonging to one of the collaborators. The owner of the second virtual desktop requests the system to switch the collaboration session to the second virtual desktop. The connection server disconnects the requesting user from the first virtual desktop, connects the user to the second virtual desktop, and invites the other collaborators to join the session on the second virtual desktop. After accepting the invitation, the collaborators are joined to the second virtual desktop and collaboration resumes on the second virtual desktop.

20 Claims, 7 Drawing Sheets

(56) References Cited

U.S. PATENT DOCUMENTS

2016/0378534 A1    12/2016   Oh
2017/0139738 A1    5/2017   Kim
2018/0060572 A1    3/2018   Singleton

* cited by examiner

LIVE SWITCHING OF COLLABORATIVE VIRTUAL DESKTOP SESSIONS

TECHNICAL FIELD

The present disclosure generally relates to virtual desktop infrastructure and more specifically to techniques for allowing multiple users to collaboratively access and switch between virtual desktops.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

Generally, when an owner of a virtual desktop desires to collaborate on her virtual desktop with other users, for example to allow each collaborator to view the virtual desktop and to produce inputs such as moue or keyboard inputs in the virtual desktop via the collaborator's own computing device, the owner must take the same steps on her virtual desktop as she would if she were using a regular locally executing desktop. This may involve installing collaboration software in the virtual desktop and on each collaborator's device, and executing the software every time a collaborative session is desired. Examples of such software are WebEx, available from Cisco WebEx, and GoToMeeting, available from Citrix Systems, Inc. However, using such additional collaborative software may produce a user experience that is not seamless and can impose various inconveniences on the users. For example, a user desiring to start or join a collaborative session may need to install the software (if it is not already installed), execute the software each time a collaborative session is initiated or joined (which may take time), and interface with the separate interface of the software throughout the process. All of this can lead to a less than optimal user experience. Further, such separate collaboration software can carry other burdens such as consumption of computing resources, licensing costs, information technology (IT) department overhead, and so on.

More recently, virtual desktop products such as VMware Horizon View, available from VMware, Inc., have started to support collaboration features that allow multiple users to collaborate on a virtual desktop through the users' virtual desktop clients. These products have the advantage of not requiring additional third-party software and leverage the existing VDI framework to produce an improved user experience; however, some inefficiencies persist. For example, when a group of users who are collaborating on one virtual desktop want to switch the collaboration to a different virtual desktop so they can continue the collaboration with the same group of users on the different desktop, they generally must perform the same steps of inviting and logging in each collaborator every time a switch from one desktop to another is performed, which is cumbersome and time-consuming.

A more efficient approach is desirable for allowing multiple users to collaboratively access and switch between virtual desktops.

DETAILED DESCRIPTION

Figure 1:
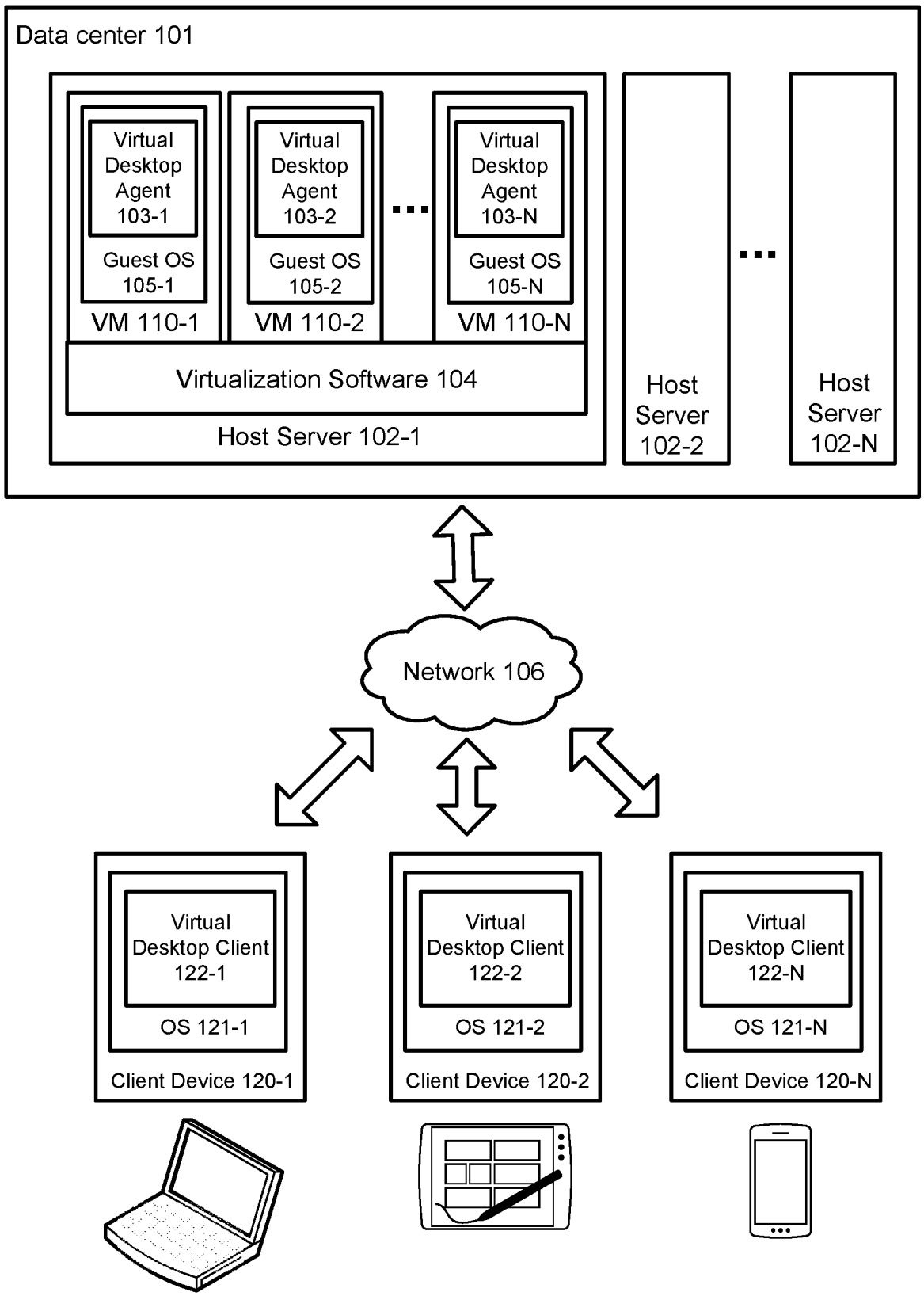
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways to enable users to switch between virtual desktops during collaborative sessions. In particular, embodiments described herein provide ways to leverage virtual desktop infrastructure (VDI) to provide seamless and efficient ways for users of the virtual desktop environment to switch a collaborative session from one desktop to another desktop.

The process can begin by a number of users joining in a collaborative session on a virtual desktop. In a typical case, this can occur by one user, the "owner", logging into her virtual desktop through a virtual desktop client application running on her computing device and sending invitations to one or more collaborators to join her virtual desktop session.

For example, once logged in, the owner can select to invite other users to collaborate on the virtual desktop by identifying those users and prompting the system to invite them to join the virtual desktop session. The system can then generate a link to the virtual desktop for each identified collaborator and send an invitation (e.g., via email or instant message) to each collaborator containing the link and a message inviting the collaborator to join the owner's virtual desktop session.

Each collaborator can then log-in and connect to the owner's virtual desktop via the collaborator's own client application. For example, once a collaborator receives the invitation on the collaborator's client device, the collaborator can accept the invitation and follow the link, which can automatically launch a virtual desktop client application on the collaborator's client device and, after performing any required user authentication procedures, the client application can connect to the virtual desktop via the provided link, thereby joining the collaborator to the virtual desktop session.

Once the collaborative session is established, the session is shared between all of the clients, meaning that the graphical user interface (GUI) of the virtual desktop is streamed to each connected client so that the owner and the collaborators can view the desktop. Other outputs (e.g., sound) can likewise be conveyed from the virtual desktop to each collaborator. Depending on the configuration of the system, inputs into the desktop (mouse inputs, keyboard commands, etc.) can be permitted or conveyed from the primary owner of the virtual desktop or from any of the connected clients. Different approaches can be implemented for controlling how the users are able to collaboratively produce inputs in the virtual desktop.

Generally, it is preferred that inputs like mouse and keyboard inputs are allowed from only one user at a time (the "controlling" user or collaborator) in order to prevent confusion, to allow the owner more control over the session, and for other reasons. For example, inputs into the virtual desktop can initially be allowed only from the owner. The owner can then delegate the inputs to any users via a dashboard in the owner's user interface ("UI"), at which point the virtual desktop can accept inputs from the chosen collaborator and the owner's inputs might no longer be allowed into the virtual desktop. The owner can be permitted to forcefully take back input control from the collaborator (i.e., without the controlling collaborators consent). A collaborator that desires to have input control may also be permitted to request control, which can be granted upon the owner's approval. In some cases, inputs may be permitted simultaneously from multiple clients, any of which may be the owner's client or collaborator clients.

In this way, the owner is able to invite and bring in any number of collaborators to join the owner's virtual desktop in a collaborative session by leveraging the existing virtual desktop infrastructure and without the inconvenience and instability of using additional standalone collaboration software. As used herein, the owner of the virtual desktop may be referred to as the "primary" user or simply as the "owner" and users that are invited into the (i.e., non-owner users) may be referred to as "shadow" users.

It should be appreciated that collaborative virtual desktop sessions can be implemented and initiated in a variety of different ways in addition to what is described herein, and this invention is not limited to any particular way of establishing or implementing collaborative virtual desktop sessions. Accordingly, the present invention may be practiced in any number of contexts where multiple client applications connect to a virtual desktop in a shared collaborative session.

Once a collaborative session with multiple collaborating clients connected to a virtual desktop is established, the users may wish to change the virtual desktop on which they are collaborating. For example, the users may wish to transfer the collaborative session to a second virtual desktop, which may be another virtual desktop belonging to the owner of the current virtual desktop or a virtual desktop belonging to one of the other collaborators, so that the group can continue their collaboration on the second virtual desktop. With past technologies, to perform the switch, the users would terminate the current collaborative session and go through the same steps of setting up a new collaborative session that were performed to start the original session (e.g., the owner of the second virtual desktop would log into the second virtual desktop, select participants, send invitations, etc.). However, this process is lengthy and cumbersome. Particularly in cases where the users may be switching back and forth between multiple desktops numerous times in the course of their interaction, it can become a significant obstacle to productive collaboration. Embodiments described herein provide a more streamlined and efficient way for performing such live switching of virtual desktops in collaborative sessions.

In various embodiments, to switch a collaborative session from one virtual desktop to another, one of the users (either the primary owner or one of the collaborators) can initiate the switch by producing a request in the virtual desktop agent UI. For example, the agent UI can include a desktop "Switch" button that the user can click. Once the request to initiate is produced, the system can retrieve a list of desktops available to the requesting user, i.e., desktops to which the user is entitled, and prompt the user to select which desktop in the list she wants to transfer the session to. After the user selects a new virtual desktop from the list, the user's client is logged into the new virtual desktop, which can be performed automatically. The system generates a link to the new virtual desktop and sends the link with an invitation to connect to the new virtual desktop to the other clients that were collaborating on the previous desktop. The system can use a previously saved mapping of the original collaborative session to identify and send the links to the other collaborating clients. Information identifying the collaborating users can also be sent to the agent of the new virtual desktop to notify the agent which users are entitled to participate in the collaborative session. The collaborating clients receive the invitations and use the provided link to connect to the new virtual desktop. Once the collaborating clients are successfully connected, the users can continue their collaboration on the new virtual desktop. In this way, the users are able to switch collaborative sessions from one to another desktop in an efficient and streamlined way.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent. Interactions between the virtual desktop client (e.g., 122-1, 122-2, 122-N) and the virtual desktop agent (e.g., 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast, virtual network computing (VNC) protocol, or the like.

A connection server or a connection broker (not pictured) can be responsible for authenticating users and establishing connections for each client device (120-1, 120-2, 120-3) to their individual virtual desktops running on host server 102-1 in the data center 101. The connection server can authenticate users (e.g., based on user name and password or fingerprint combinations), assign virtual desktops to each user, and establish connections between the clients (122-1, 122-2, 122-3) and agents (103-1, 103-2, 103-3)). The connection server can be located in the datacenter 101 or elsewhere on the network 106.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
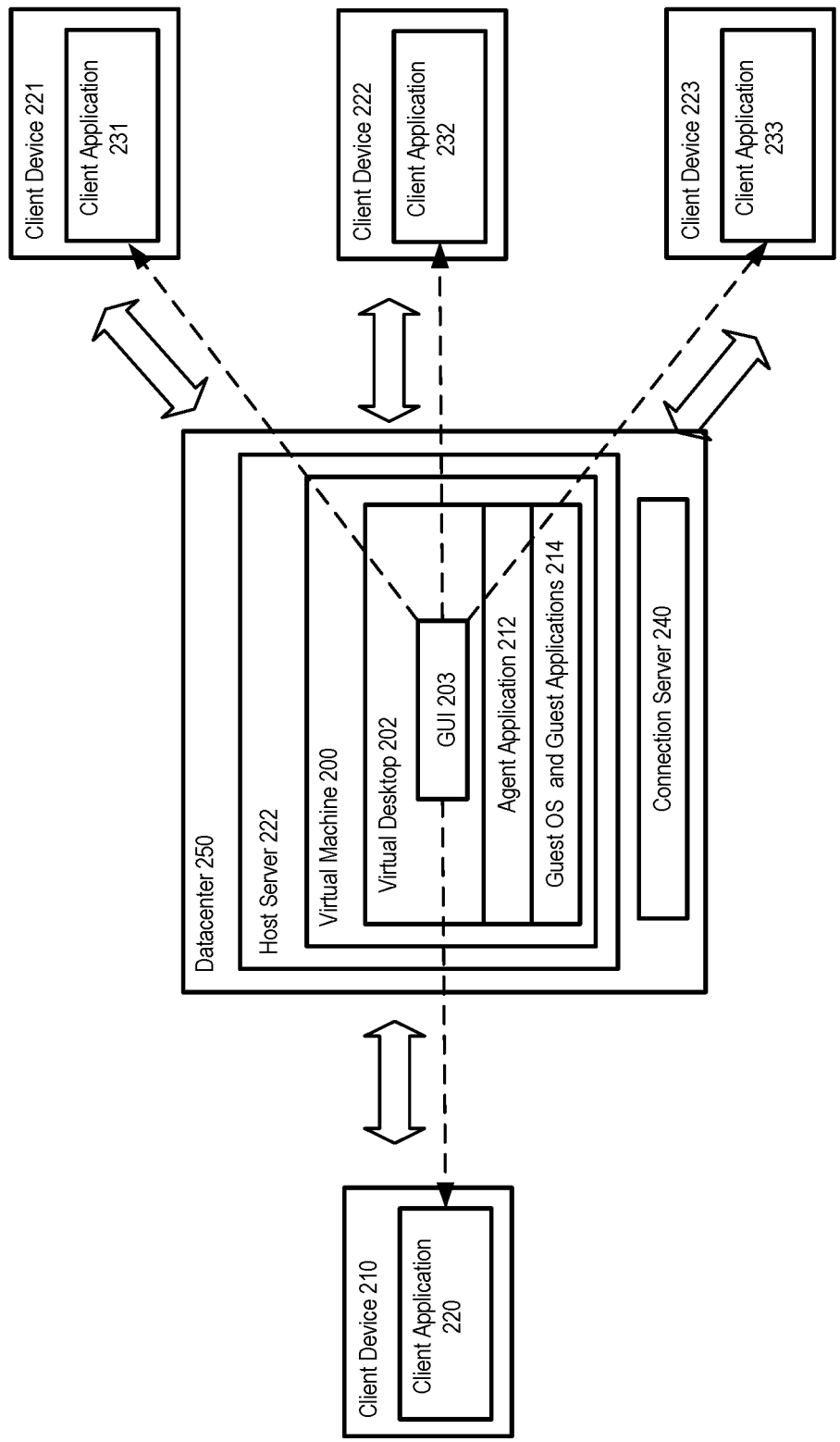
FIG. 2 illustrates an example diagram of a system for providing collaborative access to a virtual desktop.

FIG. 2 illustrates an example diagram of a system for providing collaborative access to a virtual desktop. As illustrated, a client device 210 can be communicatively linked, e.g., over a network such as the Internet or a local area network (LAN), to a virtual machine 200 residing on a host server 222, which may reside inside a datacenter 250, which may be an on-premises datacenter or a datacenter of a third-party service provider. A guest operating system (OS) and guest applications 214 may be executing in the VM 200 to produce a virtual desktop 202. A user of the client device 210 or "owner" can interact with the virtual desktop 202 via a client application 220, which may be a native client application (such as the VMware Horizon Client Application, available from VMware, Inc.), running on the client device 210 that communicates with an agent application 212 in the virtual machine 200. A connection server 240 authenticates users (e.g., based on username and password combinations) and takes requests for desktop sessions, orchestrating a secure direct protocol connection from the client 220 to the agent 212. In this example, the connection server is located in the datacenter 250.

User inputs, such as keyboard and mouse inputs, produced in the client application 220 can be transmitted by the client application 220 to the agent 212 based on a remoting protocol, and the agent can inject the inputs into the virtual desktop 202 to effectuate them. Outputs of the virtual desktop 202, such as the GUI 203 of the virtual desktop 202, can be transmitted by the agent 212 to the client device 210 (as illustrated by the broken area from the GUI 203 to the client 220) based on the remoting protocol and displayed in the client application 220. Other outputs, such as audio, can likewise be conveyed to the client 220. In this way, a user of the client device 210 may be able to interact with the virtual desktop 202 as if it was executing locally on the client device 210 while execution actually takes place in the remote VM 200.

In various embodiments, a user or "owner" of the virtual desktop 202 can initiate a virtual desktop 202 session by executing the client application 220 and authenticating herself with connection server 240 (e.g., by providing a login ID and a password). The desktop session can be established and the owner's client 220 can be connected to the virtual desktop 202, as indicated by the double-sided arrow between the desktop 202 and client 220. For example, the connection between the client 220 and the virtual desktop 202 can be a remoting protocol session.

Consequently, other users can be invited to connect to the virtual desktop as collaborators. For example, users can be invited by sending an invitation (e.g., via email, instant message, etc.) containing a link to the virtual desktop 202 to each users' client devices (e.g., 221, 222, 223). The link can comprise information for routing to the virtual desktop 202, such as the desktop's 202 address on the local network or on a WAN (such as a URL). The collaborators' client devices 221, 222, 223 can be any client devices that are communicatively linked over a network to the server 222. For example, the collaborator devices 221, 222, 223 may be located on the local enterprise network or they may be located more remotely and connected over the Internet.

In various embodiments, the owner can prompt the system (e.g., via the agent 212) to send an invitation to a set of identified users via an option in a UI in the client 220. The system (e.g., the agent 212) can send the invitation to each client device 221, 222, 223 in response to the received instruction from the client 220 to initiate the collaborative session with the users. In other embodiments, invitations can be sent to the collaborator devices 221, 222, 223 in other ways, e.g., from the client device 210.

Once a collaborator client device 221, 222, 223 receives the invitation, the user of the client device 221, 222, 223 may accept the invitation, e.g., by clicking on the link in the email, IM, etc. When the collaborator accepts the invitation or clicks on the link, the client device 221, 222, 223 can automatically launch a virtual desktop client application 231, 232, 233 and connect to the virtual desktop via the supplied link, or if the virtual desktop client application 231, 232, 233 is already running on the client device 221, 222, 223 then it can simply be connect to the virtual desktop 202 following the link.

Once a collaborator's client 231, 232, 233 is launched and routed to the virtual desktop 202, prior to allowing connection, the connection server 240 can authenticate each collaborator (e.g., by requesting a username and password, fingerprint, or however else authentication may be set up). In various embodiments, the same mechanisms can be used for connecting collaborators to the shared desktop as implemented in standard virtual desktop connections between a client and a virtual desktop (i.e., without collaboration). For example, the connection between each collaborator's client 231, 232, 233 and the virtual desktop 202 can be a separate remoting protocol session, while the owner's client 220 can also be connected to the virtual desktop 202 via its own separate remote desktop protocol session.

To clarify, as used herein in various embodiments, the terms "virtual desktop session" or "desktop session" refer to a running instance of the virtual desktop (e.g., 202) in the virtual machine 200 (e.g., a Windows session). Each client (e.g., 220, 231, 232, 233) can connect to the virtual desktop (e.g., 202) via a separate remoting protocol session. Hence, during collaboration, clients (e.g., 220, 231, 232, 233) can share or connect to the same virtual desktop session, each via its own unique connection or remoting protocol session.

After the collaborative clients 231, 232, 233 are authorized by the server 240, a connection can be established between each client 231, 232, 233 and the virtual desktop 202, as indicated by the double-sided arrows pointing to the client devices 231, 232, 233. The GUI 203 of the virtual desktop can be streamed to each client 231, 232, 233 via the corresponding connection.

As a result, each collaborative client 231, 232, 233 may be able to display the GUI 203 of the virtual desktop 202 so the participants of the collaborative session are able to view the GUI 203 on their devices 221, 222, 223. Further, to enable active collaboration, various techniques can be implemented to allow the owner as well as each invited user to produce inputs in the desktop 202, such as mouse and keyboard inputs. For example, input control can be shared among the users, such that inputs from more than one of the clients 220, 231, 332, 233 are allowed into the virtual desktop 202 at the same time. In other embodiments, input control can be passed around, such that inputs from only one of the clients 220, 231, 332, 233 are allowed into the virtual desktop 202 at any given time.

In various embodiments, the owner can be given authority to select (via a dashboard UI) which user or users have input control at any given time. The owner may be able to grant or take back such control at any point. In other embodiments, a collaborator may be able to request input control and receive control when the owner consents.

The system can control which clients (e.g., 220, 231, 332, 233) are permitted to produce inputs in the desktop 202 in a variety of ways. In an embodiment, the agent 212 can receive inputs from each collaborator's client (as well as from the owner's client) and decide which input to process. If the desktop session owner gives input control to a collaborator, the agent 212 can process the input from that specific collaborator while ignoring inputs from others (including the session owner).

For example, each client 220, 231, 332, 233 may be permitted to convey inputs to the virtual desktop 202 in the same way as in a standard, non-collaborative VDI session (i.e., each client 220, 231, 332, 233 may believe that it has input control); however, the agent 212 can mute inputs from clients 220, 231, 332, 233 that it is instructed do not have input control, and permit inputs from clients that the agent 212 is instructed do have input control. In this way, a standard VDI connection can be implemented between the virtual desktop 202 and each client 220, 231, 332, 233 (i.e., with screen data flowing to the clients 220, 231, 332, 233 from the desktop 202 and inputs flowing in the opposite direction from the clients 220, 231, 332, 233 to the desktop 202) while the agent 212 selectively determines which clients' 220, 231, 332, 233 inputs to mute and which clients' 220, 231, 332, 233 inputs to permit.

As mentioned, after establishing the virtual desktop 202 session, the session owner (i.e., the user of the client device 210) can select to invite other users to collaborate on the virtual desktop. For example, the agent application 212 can provide an invitation UI that can be displayed in the client 220, which the owner can bring up at any point during the session (e.g., by clicking on a button or a menu item labeled "collaborative session" or the like in the client 220). The invitation UI can give the owner the option to invite participants and form a collaborative session. Such an invitation UI may include a dialog box that allows the owner to identify a list of desired collaborators. The invitation UI may also allow the owner to choose how the collaborators should be invited (e.g., via email, instant message (IM), or otherwise).

In an enterprise setting, for example, the owner may be able to invite anyone on a domain that the server 240 allows for authentication. The agent 212 can automatically determine whether an e-mail and/or IM client is installed for a given invitee by querying the system; for example, by looking up the default handlers for the mailto:// and im:// schemas, and extract the binary name, hiding an option if there are no registered handlers for its respective schema.

Once the owner selects to send the invitation, one invitation message per collaborator can be automatically generated using the mechanism the owner specified. At a technical level, this can be done by formatting and launching the appropriate mailto:// or im:// URL (see RFCs 3860 and 2368 for the specifics).

It should be noted that the present invention is not limited to any particular way of establishing and implementing a collaborative session among multiple clients and the processes for establishing and implementing collaborative sessions described herein are provided only by way of example.

Figure 3:
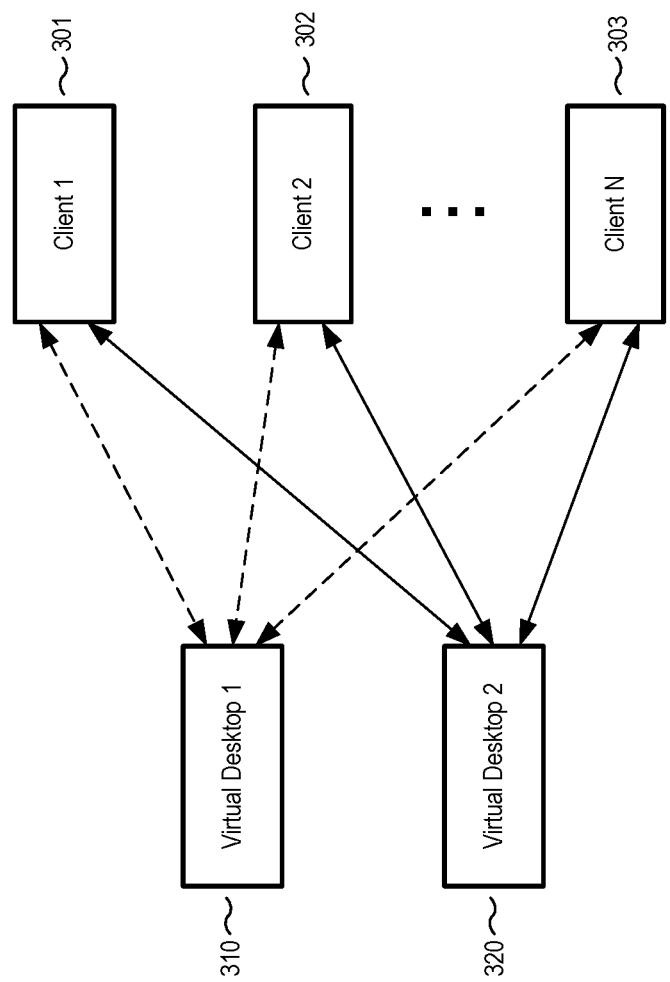
FIG. 3 illustrates an example diagram of live virtual desktop switching in a collaborative virtual desktop session, in accordance with various embodiments.

FIG. 3 illustrates an example diagram of live virtual desktop switching in a collaborative virtual desktop session, in accordance with various embodiments. As illustrated in the example of FIG. 3, client 1 301, and client 2 302 through client N 303 are initially connected in a collaborative session with virtual desktop 1 310. A connection server (not pictured) can authenticate and establish the connection between each client 301, 302, 303 and an agent (not pictured) of virtual desktop 1 310. While three clients are illustrated in the example of FIG. 3, in a real-life scenario a collaborative session can include from two to any number of clients. Each of the clients (301, 302, 303) in FIG. 3 may be executing on a separate computing device used by a different user. Virtual desktop 1 310 may belong to a user of one of the clients (301, 302, 303). For example, the user of client 1 301 may be the owner of desktop 1 310. Accordingly, to establish the collaborative session on virtual desktop 1 310, client 1 301 can log into virtual desktop 1 310 and invite the other users to join the session (i.e., users of clients 2 302 through N 303).

The collaborative session with virtual desktop 1 310 is illustrated by the broken line arrows between virtual desktop 1 310 and the clients 301, 302, 303. As illustrated by the broken line arrows, information can flow in both directions between virtual desktop 1 310 and each client 301, 302, 303 using a remote desktop protocol, such as Remote Desktop Protocol (RDP), PC-over-IP protocol (PCoIP), VMware Blast, virtual network computing (VNC) protocol, or the like. For example, the GUI of virtual desktop 1 310 can be streamed to each client and input commands, such as keyboard and mouse inputs, can be transmitted from the clients 301, 302, 303 to virtual desktop 1 310. As described above, the session may be configured to allow inputs into the virtual desktop 1 310 from only some or only one of the clients 301, 302, 303.

As illustrated in the example of FIG. 3, after the collaborative session with virtual desktop 1 310 is established, the collaborative session is switched to virtual desktop 2 320 (indicated by the solid line arrows between virtual desktop 2 320 and each client 301, 302, 303) by disconnecting the clients 301, 302, 303 from virtual desktop 1 310 and connecting them to virtual desktop 2 320. In the collaborative session with virtual desktop 2 320, each client 301, 302, 303 is now connected to virtual desktop 2 (e.g., each client can connect to an agent of virtual desktop 2 320). Information now flows in both directions between virtual desktop 2 320 and each client 301, 302, 303. Virtual desktop 2 320 may belong to the same user as virtual desktop 1 310 (i.e., user of client 1 301) or to a different user (i.e., a user of any of clients 2 302 through client N 303). The GUI of the virtual desktop 2 320 can be streamed to each client 301, 302, 303 and input commands can be allowed into the virtual desktop 2 320 from any of the clients 301, 302, 303 via each separate client connection.

In various embodiments, the process of switching desktops can be initiated by a user of one of the clients (301, 302, 303) making an input to request to switch the collaborative session to a different virtual desktop (e.g., 320). For example, the user of client 1 301 can make a request to switch the session to virtual desktop 2 320 via the client 301. In an embodiment, a user interface of the agent of the virtual desktop 1 310 can present a collaboration UI that gives users the option to make such a request. In other embodiments, the UI of the client 301 can provide the user such an option. After the user requests to change desktops, the system (e.g., via the connection broker) queries its database (e.g., a user/desktop database) to identify what virtual desktops the user is entitled to. For example, the connection broker can check what virtual desktops are assigned to the username of the client 1 301 user. The system then displays the list of the desktops to which the user is entitled and prompts the user to select which desktop she wishes to switch the session to. For example, the list of desktops can be presented in the collaboration UI on the agent side.

The client 1 301 user then selects the virtual desktop to which she wants to switch the session to from the list (in this case, virtual desktop 2 320) and the agent sends a switch desktop message to notify the connection server that the session on desktop 1 310 is being carried over to desktop 2 320, and that the client 1 user will be connecting to desktop 2 320. The message can include information such as the client 1 user username, the selected new desktop 320 name (or desktop ID), the old desktop 310 name (or desktop ID), and the session ID of the session with desktop 1 310. The switch desktop message can be an instruction to the connection server to connect the user of client 1 to desktop 2 320 and to establish a collaborative session on desktop 2 320. Once the connection server gets the session switch information from the desktop 1 310 agent, it sends a message to client 1 301 to request confirmation to disconnect client 1 301 from the current session and connect it to desktop 2 320. For example, the connection server can send a request to client 1 301 and client 1 can prompt the user (e.g., via a message on the client 1 301 UI) to confirm disconnecting the current session and connecting to virtual desktop 2 320. For example, the message may be a pop-up dialog with the following text: "Do you want to disconnect current session and connect to [desktop 2 name]?". The pop-up dialog can have an "OK" button (which confirms the switch) and a "Cancel" button (which cancels the switch and keeps client 1 connected to desktop 1 310.

After the user gives confirmation (e.g., by pressing "OK"), the connection server can terminate the client 1 301 connection with virtual desktop 1 310, launch virtual desktop 2 320, and connect client 1 301 to virtual desktop 2 302. Notably, if virtual desktop 1 310 belongs to the user of client 1 301, then the collaborative session with virtual desktop 1 can be terminated and all other users (302, 303) can be disconnected from desktop 1 310 when client 1 301 disconnects. If virtual desktop 1 310 does not belong to the user of client 1 301, then the other users (302, 303) can remain logged on and continue to collaborate without client 1 301. Generally, because the user of client 1 301 has already been verified, the connection server can log her into virtual desktop 2 320 without authenticating (e.g., by entering a username and password). However, in some embodiments the user may still be required to authenticate herself to connect client 1 301 to virtual desktop 2 320.

The connection server can be notified that the session established on desktop 2 320 will be a collaborative session (e.g., the switch desktop message from the agent can notify the connection server that the session will be a collaborative session). Accordingly, when the session between client 1 301 and desktop 2 320 is established, the connection server flags it as a collaborative session.

In various embodiments, when a collaboration session is set up (e.g., with desktop 1 310), the connection server can store various information about the session in a mapping table, which will be used for session switching. If session parameters change (e.g., by adding or removing a collaborator, changing desktops, etc.) the mapping table is updated. In various embodiments, the session information stored in the mapping table can include: collaboration session ID, desktop name, primary username, shadow usernames, and collaboration session URL (uniform resource locator).

When client 1 301 connects to virtual desktop 2 320, the connection server observes that a collaboration session on desktop 2 is requested (e.g., by observing the flag) and begins setting up the collaboration. The connection server can identify that the collaboration on desktop 2 320 is being carried over from the collaborative session on desktop 1 310 (e.g., the switch message from the agent can identify the previous collaborative session) and retrieve information about the desktop 1 310 session from a stored mapping table corresponding to the desktop 1 310 session. From the mapping table, the connection server can retrieve the usernames of collaborators in the desktop 1 310 session and send the usernames to the agent of desktop 2 320 (e.g., to notify the agent what usernames will be entitled to connect to it in the collaboration session).

After client 1 301 establishes the connection to desktop 2 320, the agent in desktop session 2 can send a link to the session (e.g., a URL) to the connection server. The connection server can then send the link to all recorded collaborators (i.e., to the collaborators' clients) that are connected to the connection server. For example, the connection server can query the mapping table of the desktop 1 310 session to determine all collaborators to send the link to. That is, the connection server can send the link to all collaborators who were connected to desktop 1 310 in the previous session. The connection server may not send the link to client 1 301 (since it is already connected). Hence, the link may be sent to all previous collaborators' clients (302, 303) except the owner of desktop 2 (client 1 301), since client 1 301 is already connected. Notably, in various embodiments, the owner of desktop 2 may be different or the same as the owner of desktop 1. Along with a link, the connection server can send an invitation to the corresponding clients to connect to desktop 2 320. The invitation can further include the name of desktop 2 320 to help the user identify what virtual desktop he or she is being requested to connect to.

When client 2 302 and client N 303 receive the link (and invitation to connect) to desktop 2 320, the clients can prompt the users to confirm making the connection. For example, the clients 302, 303 can present a pop-up dialogue in the client UI (similar to the dialog presented on client 1 above) requesting the user to confirm connecting to desktop 2 320 and, if the client is still connected to desktop 1 310, to confirm disconnecting the previous session. If the user confirms the new connection (e.g., by pressing an "OK" button), then the client (e.g., 302 or 303) can be connected to the desktop 2 320 agent by the connection server. If the user refuses (e.g., by pressing the "Cancel" button), then the client would not be joined to the collaboration session on desktop 2 320. Generally, because the users of client 2 302 and client N 303 have already been verified, the connection server can log them into virtual desktop 2 320 automatically without authentication once the users confirm. However, in some embodiments the users may still be required to authenticate themselves to connect client 2 302 and client N 303 to virtual desktop 2 320. Once the clients (301, 302, 303) are connected to virtual desktop 2 320, the users can collaborate on virtual desktop 2 320.

As mentioned previously, in various embodiments the system is configured so that inputs like mouse and keyboard inputs are allowed from only one user at a time (the "controlling" user or collaborator). This can be preferable in order to prevent multiple users from moving the mouse cursor or entering keyboard inputs at the same time, for giving the owner more control over his or her desktop, and for other reasons. In these embodiments, after the owner connects to the virtual desktop and the collaborative session is established, inputs into the desktop are initially allowed only from the owner. The owner can then delegate the inputs to any users via a dashboard in the owner's user interface, at which point the virtual desktop will accept inputs from the chosen collaborator and the owner's inputs would no longer be allowed into the virtual desktop.

In various embodiments, only a user with input control might be able to switch the virtual desktop in a collaborative session. For example, when session switching is performed via a UI in the agent (as described above and further below), only a controlling user would be able to initiate the switch, since only the controlling user is able to make inputs into the agent UI. Thus, when the owner of a session has control, he or she would be able to request a desktop switch and the system would respond by retrieving a list of the owner's entitled desktops and asking her to pick which desktop to switch to, as described above. If, on the other hand, the collaborators desire to switch to the desktop of one of the other user (i.e., one of the shadow users), the owner would first delegate control to the shadow user and the shadow user would then be able to request a desktop switch (via the same agent UI) and the system would respond by retrieving a list of the shadow user's entitled desktops and asking the shadow user to pick which desktop to switch to, as described above.

Figure 4A:
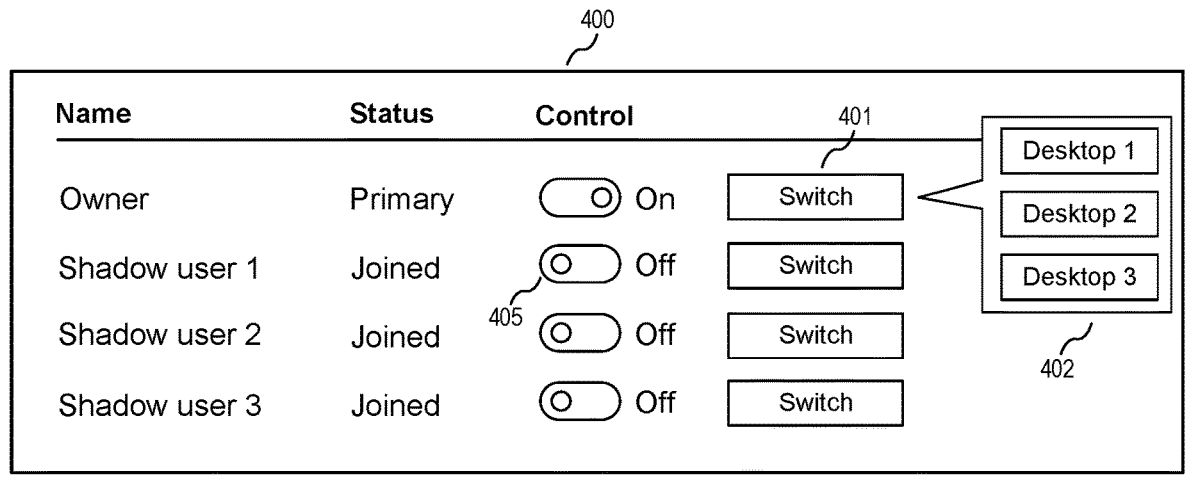
FIG. 4A illustrates an example of a collaboration UI where the owner has control, in accordance with various embodiments.

FIG. 4A illustrates an example of a collaboration UI where the owner has control, in accordance with various embodiments. The UI 400 illustrated in this example can be produced by the virtual desktop agent and can appear over the virtual desktop GUI. The UI 400 may be visible to all collaborators but only a collaborator with control may be able to produce inputs in the UI 400. As illustrated in the example of FIG. 4A, the UI 400 lists the collaborators under the column "Name", including the "Owner", "Shadow user 1", "Shadow user 2", and "Shadow user 3". In a real-life implementation, other information corresponding to each user may be listed in this column, such as the actual name of the user, his or her username, email address, etc. The UI 400 further lists the status of each user under the column "Status". In this session, the Owner's status is "Primary", indicating that he or she is the owner of the desktop where the collaboration is taking place. The status of each shadow user is "Joined", indicating that each shadow user is currently collaborating on the desktop but does not own the desktop.

The next column, "Control", indicates which user has input control in the session with an illustration of an on/off button. As illustrated, in this example the owner has control (since the button corresponding to the owner is in the "On" position), and the shadow users do not have control (since the button corresponding to each shadow user is in the "Off" position). The UI 400 further illustrates a "Switch" button corresponding to each user, which the corresponding user can click to switch desktops when the user has control. The "Switch" buttons of each user who doesn't have control (i.e., Shadow users 1, 2, and 3 in this case) can be grayed out and disabled. This way, a user doesn't have an option to request switching desktops to a desktop that doesn't belong to the user. When control is delegated to a user, the "Switch" button can be enabled for the user and made to appear normal (i.e., not grayed out).

In this case, the "Switch" button 401 corresponding to the owner is enabled, since the owner has control. The owner can click the button 401 to request switching desktops. In response, the system can query its user/desktop database to determine what desktops the owner is entitled to and the UI can present a pop-up window 402 listing the owner's desktops. The user can select one of the desktops from the list (e.g., by clicking it), and the system can begin the process of switching the desktop session to the virtual desktop selected by the owner.

In various embodiments, the owner can delegate control to a shadow user. For example, this may be done through the same UI 400 by clicking the "Control" on/off switch corresponding to the user to whom the owner wants to transfer control. In this example, the user can click the button 405 to delegate control to Shadow user 1.

Figure 4B:
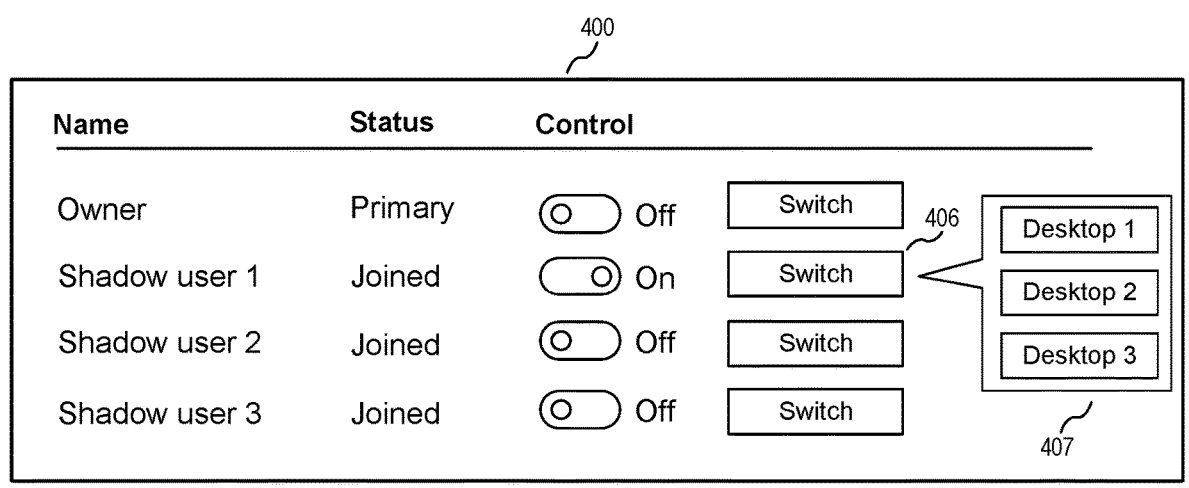
FIG. 4B illustrates an example of a collaboration UI where Shadow user 1 has control, in accordance with various embodiments.

FIG. 4B illustrates an example of a collaboration UI where Shadow user 1 has control, in accordance with various embodiments. The example of FIG. 4B illustrates the UI 400 described in FIG. 4A with control now delegated to Shadow user 1. As illustrated, the UI 400 lists the same Names and the same Statuses as FIG. 4A, since delegating control does not change these items. The "Control" column now indicates that Shadow user 1 has control (since the button corresponding to Shadow user 1 is in the "On" position), and the Owner and Shadow users 2 and 3 do not have control (since the buttons corresponding to them are in the "Off" position). The "Switch" buttons corresponding to the Owner and Shadow users 2 and 3 can be grayed out and disabled, and the "Switch" button 406 corresponding to Shadow user 1 is now enabled and not grayed out, since Shadow user 1 has control.

Shadow user 1 can click the button 406 to request switching desktops. In response, the system can query its user/desktop database to determine what desktops Shadow user 1 is entitled to and the UI can present a pop-up window 407 listing the Shadow user 1 desktops. Shadow user 1 can select one of the desktops from the list (e.g., by clicking it), and the system can begin the process of switching the desktop session to the virtual desktop selected by Shadow user 1. Further, Shadow user 1 can delegate control to another shadow user or to the Owner. For example, this may be done through the same UI 400 by clicking the "Control" on/off switch corresponding to the user to whom Shadow user 1 wants to transfer control.

Figure 5:
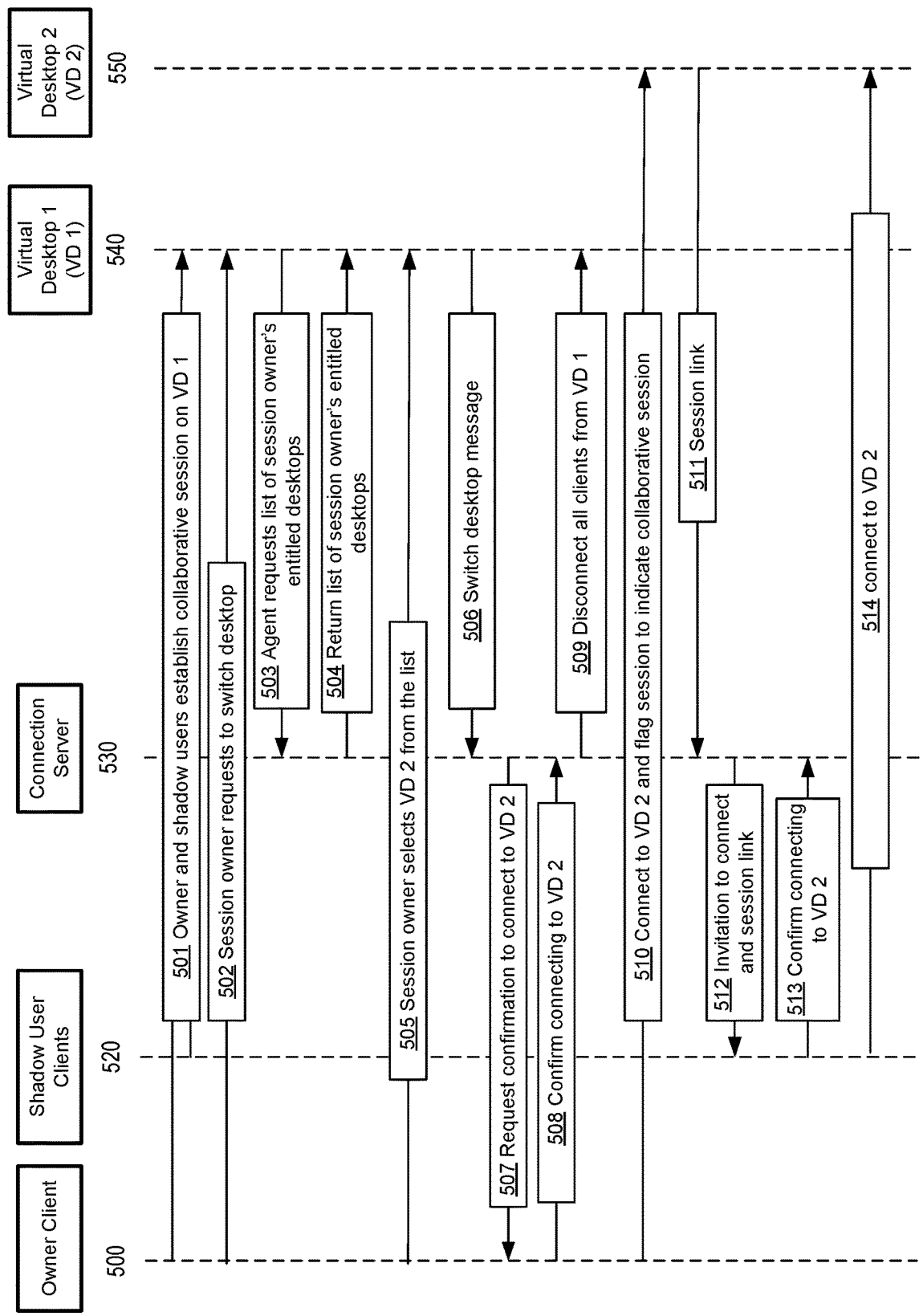
FIG. 5 illustrates a process flow for switching a collaborative virtual desktop session to a different virtual desktop belonging to the session owner, in accordance with various embodiments.

FIG. 5 illustrates a process flow for switching a collaborative virtual desktop session to a different virtual desktop belonging to the session owner, in accordance with various embodiments. The process begins in step 501 by establishing a collaborative session on virtual desktop 1 (VD 1) 540 by the owner client 500 and shadow user clients 520. VD 1 540 belongs to the owner client 500, that is, the user logged in on the owner client 500 is the owner of VD 1 540, and the shadow users (logged in through shadow user clients 520) have joined the session on VD 1 540. The connection server 530 is responsible for establishing the connections between the owner client 500 and shadow user clients 520, and the VD 1 540 agent.

In step 502, the session owner makes a request at the VD 1 540 agent to switch the collaboration session to a different virtual desktop. As described above, the owner may do this via a UI of the VD 1 540 agent that the owner accesses through the owner client 500. Notably, after the session is established, the owner client 500 has input control while the shadow clients are only observers, and so the owner is able to request the desktop switch on the VD 1 540 agent UI. After the VD 1 540 agent receives the owner's request to change desktops, in step 503, the VD 1 540 agent requests a list of the session owner's entitled desktops from the connection server 530. In step 504, the connection server 530 queries its database (e.g., a user/desktop database) to identify what virtual desktops the owner is entitled to and returns the list of entitled desktops to the VD 1 540 agent. The VD 1 540 agent prompts the owner to select a virtual desktop to switch to from the list of entitled desktops and, in step 505, the session owner selects VD 2 550 from the list.

In step 506, the VD 1 540 agent sends a switch desktop message to notify the connection server 530 that the session on VD 1 540 is being carried over to VD 2 550, and that the owner client 500 will be connecting to VD 2 550. The message can include information such as the owner username, the VD 2 550 name (or desktop ID), the VD 1 540 name (or desktop ID), and the session ID of the session with VD 1 540. The switch desktop message can also provide an instruction to the connection server 530 to connect the owner client 500 to VD 2 550 and to establish a collaborative session on VD 2 550.

After the connection server 530 gets the session switch information from the VD 1 540 agent, it sends a message to the owner client 500 to request confirmation to disconnect the owner client 500 from the current session with VD 1 540 and to connect it to VD 2 550, in step 507. In step 508, after the owner confirms connecting to VD 2 550 (e.g., by clicking "OK" on a pop-up dialog in the owner client 500 UI), the owner client 500 sends confirmation to connect to VD 2 550 to the connection server 530. In step 509, the connection server 530 disconnects the owner client 500 and the shadow user clients 520 from VD 1 540. In step 510, the connection server 530 automatically connects the owner client 500 to VD 2 550 and flags the session to indicate that a collaborative session will be produced. At this point, the connection server 530 also retrieves a saved mapping table corresponding to the VD 1 540 session, obtains the usernames on the shadow user clients 520 from the mapping table, and sends the shadow user usernames to the VD 2 550 agent (step not pictured).

After the owner client 500 is connected to VD 2 550, the VD 2 550 agent sends a link (such as a URL) to the VD 2 550 session to the connection server 530 in step 511. In step 512, the connection server 530 sends an invitation to join the VD 2 550 session, including the session link and VD 2 550 name to the shadow user clients 520. For example, the connection server 530 can query the saved mapping table of the VD 1 540 session to identify the shadow user clients 520 to send the link to. In step 513, the shadow user clients 520 send confirmation to the connection server 530 to connect to VD 2 550 (e.g., after receiving confirmation from users of the shadow user clients 520). In step 514, the shadow user clients 520 are automatically connected to VD 2 550 by the connection server 530. The owner and shadow users can then resume collaborating on VD 2 550.

Figure 6:
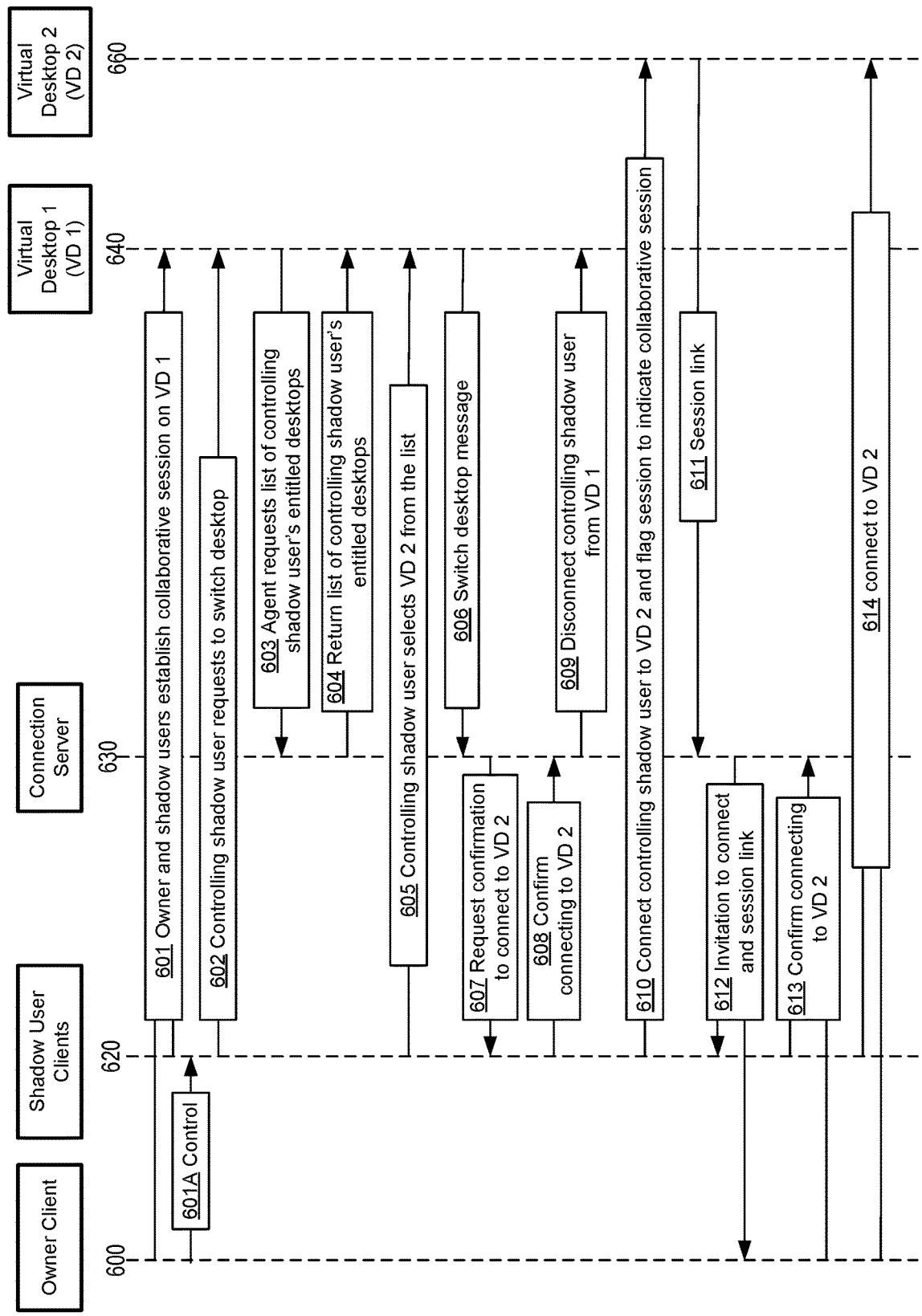
FIG. 6 illustrates a process flow for switching a collaborative virtual desktop session to a different virtual desktop belonging to a shadow user, in accordance with various embodiments.

FIG. 6 illustrates a process flow for switching a collaborative virtual desktop session to a different virtual desktop belonging to a shadow user, in accordance with various embodiments. The process begins in step 601 by establishing a collaborative session on virtual desktop 1 (VD 1) 640 by the owner client 600 and shadow user clients 620. As in the example of FIG. 5, VD 1 640 belongs to the owner client 600 and the connection server 630 is responsible for establishing the connections between the owner client 600 and shadow user clients 620, and the VD 1 640 agent. After the session is established, the owner client 600 has input control while the shadow clients 620 are only observers. To allow a shadow user to switch the session to his or her virtual desktop, the session owner, in step 601A, delegates control to one of the shadow users 620 (the "controlling shadow user"). After control is delegated, the controlling shadow user is able to make inputs into VD 1 640, while the owner and any other shadow users are observers. To be clear, shadow user clients 620 include the client of the controlling shadow user as well as the clients of other (observing) shadow users.

In step 602, the controlling shadow user makes a request at the VD 1 640 agent to switch the collaboration session to a different virtual desktop (e.g., the request can be made via a UI of the VD 1 640 agent). After the VD 1 640 agent receives the controlling shadow user's request to change desktops, in step 603, the VD 1 640 agent requests a list of the controlling shadow user's entitled desktops from the connection server 630. In step 604, the connection server 630 queries its database (e.g., a user/desktop database) to identify what virtual desktops the controlling shadow user is entitled to and returns the list of entitled desktops to the VD 1 640 agent. The VD 1 640 agent prompts the controlling shadow user to select a virtual desktop to switch to from the list of entitled desktops and, in step 605, the controlling shadow user selects VD 2 660 from the list.

In step 606, the VD 1 640 agent sends a switch desktop message to notify the connection server 630 that the session on VD 1 640 is being carried over to VD 2 660, and that the controlling shadow user will be connecting to VD 2 660. The message can include information such as the controlling shadow user username, the VD 2 660 name (or desktop ID), the VD 1 640 name (or desktop ID), and the session ID of the session with VD 1 640. The switch desktop message can also provide an instruction to the connection server 630 to connect the controlling shadow user client (included in 620) to VD 2 660 and to establish a collaborative session on VD 2 660.

After the connection server 630 gets the session switch information from the VD 1 640 agent, it sends a message to the controlling shadow user client (included in 620) to request confirmation to disconnect the controlling shadow user client from the current session with VD 1 640 and to connect it to VD 2 660, in step 607. In step 608, after the controlling shadow user confirms connecting to VD 2 660 (e.g., by clicking "OK" on a pop-up dialog in the controlling shadow user client (included in 620) UI), the controlling shadow user client (included in 620) sends confirmation to connect to VD 2 660 to the connection server 630. In step 609, the connection server 630 disconnects the controlling shadow user client (included in 620) from VD 1 640. In step 610, the connection server 630 automatically connects the controlling shadow user client (included in 620) to VD 2 660 and flags the session to indicate that a collaborative session will be produced. At this point, the connection server 630 also retrieves a saved mapping table corresponding to the VD 1 640 session, obtains the usernames of the owner of VD 1 640 and of the shadow user clients 620 other than the controlling shadow user from the mapping table, and sends the usernames to the VD 2 660 agent (step not pictured).

After the controlling shadow user client (included in 620) is connected to VD 2 660, the VD 2 660 agent sends a link (such as a URL) to the VD 2 660 session to the connection server 630 in step 611. In step 612, the connection server 630 sends an invitation to join the VD 2 660 session, including the session link and VD 2 660 name to the owner client 600 and the shadow user clients 620 other than the controlling shadow user client. For example, the connection server 630 can query the saved mapping table of the VD 1 640 session to identify the owner client 600 and shadow user clients 620 to send the link to. In step 613, the owner client 600 and the shadow user clients 620 other than the controlling shadow user client send confirmation to the connection server 630 to connect to VD 2 660 (e.g., after receiving confirmation from users of the clients). In step 614, the owner client 600 and the shadow user clients 620 other than the controlling shadow user client are disconnected from VD 1 640 and are automatically connected to VD 2 660 by the connection server 630. The owner and shadow users can then resume collaborating on VD 2 660.

Figure 7:
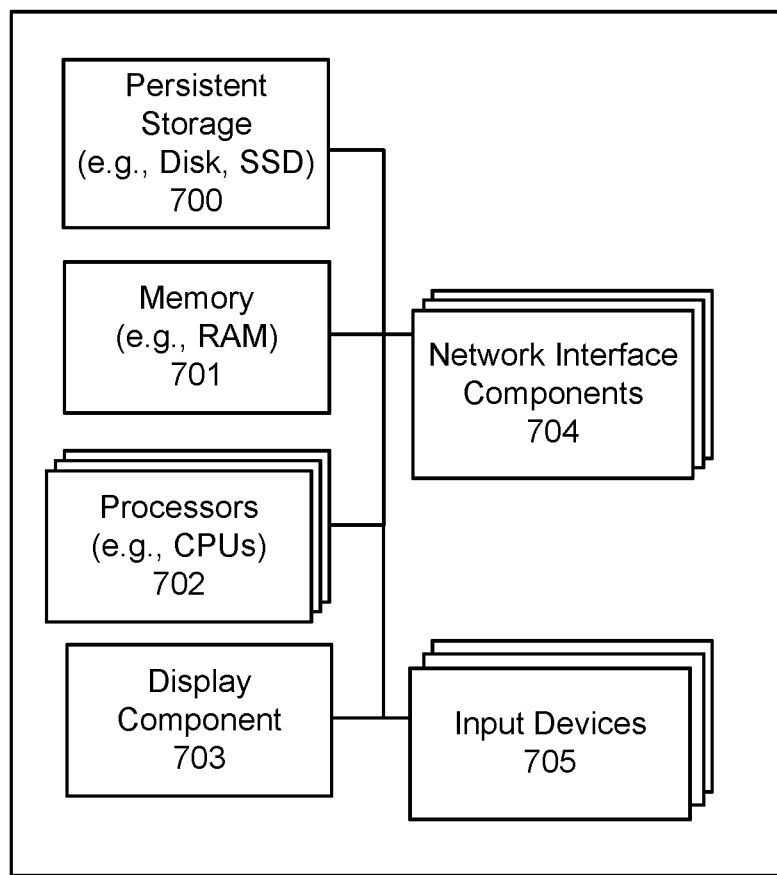
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in a storage medium component. The storage medium can include many types of memory, persistent data storage, or non-transitory computer-readable storage media. For example, the storage medium may take the form of random access memory (RAM) 701 storing program instructions for execution by the processor(s) 702, a persistent storage (e.g., disk or SSD) 700, a removable memory for sharing information with other devices and/or the like. The computing device typically can further comprise a display component 703, such as a monitor, a touch screen, liquid crystal display (LCD), or the like. In various embodiments, the computing device will include at least one input device 705 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   establishing a first collaborative virtual desktop session for a plurality of client devices on a first virtual desktop executing on a server by, for each client device in the plurality of client devices:
      connecting via a connection server a virtual desktop client executing on the client device to a first virtual desktop agent of the first virtual desktop and establishing a first remote desktop protocol session between the virtual desktop client and the first virtual desktop, wherein the graphical user interface (GUI) of the first virtual desktop is streamed to the virtual desktop client via the first remote desktop protocol session, and wherein user inputs into the first virtual desktop produced on the virtual desktop client are conveyed by the virtual desktop client to the first virtual desktop agent via the first remote desktop protocol session;
   receiving a request at the connection server to switch the collaborative session from the first virtual desktop to a second virtual desktop, the second virtual desktop belonging to a user of a particular client device in the plurality of client devices;
   in response to the request, establishing a second collaborative virtual desktop session on the second virtual desktop and switching the plurality of client devices from the first collaborative virtual desktop session to the second collaborative virtual desktop session by:
      logging the user into the second virtual desktop; and
      for each client device in the plurality of client devices, connecting via the connection server the virtual desktop client executing on the client device to a second virtual desktop agent of the second virtual desktop and establishing a second remote desktop protocol session between the virtual desktop client and the second virtual desktop, wherein the graphical user interface (GUI) of the second virtual desktop is streamed to the virtual desktop client via the second remote desktop protocol session, and wherein user inputs into the second virtual desktop produced on the virtual desktop client are conveyed by the virtual desktop client to the second virtual desktop agent via the second remote desktop protocol session.

2. The method of claim 1, further comprising:
   receiving a request at the first virtual desktop agent from the particular client device to switch the collaborative session to the second virtual desktop; and
   conveying, by the first virtual desktop agent to the connection server, the request to switch the collaborative session to the second virtual desktop.

3. The method of claim 1, further comprising:
requesting from the connection server a list of virtual desktops to which the user of the particular client device is entitled; and
receiving, from the particular client device, an election of the second virtual desktop from the list of entitled virtual desktops.

4. The method of claim 1, wherein:
mouse and keyboard inputs into the first virtual desktop are permitted from a virtual desktop client selectably designated by an owner of the first virtual desktop as a controlling virtual desktop client and not from other virtual desktop clients; and
a request to switch the first virtual desktop to another desktop is only permitted from a controlling virtual desktop client.

5. The method of claim 1, wherein the connection server stores a mapping of the first collaborative session on the first virtual desktop, the mapping comprising usernames of users of the virtual desktop clients on the plurality of client devices.

6. The method of claim 5, wherein the connecting via the connection server the virtual desktop client executing on the client device to the second virtual desktop agent of the second virtual desktop for each client device in the plurality of client devices is performed by the connection server based on the mapping.

7. The method of claim 1, wherein user authentication is required to connect each of the plurality of client devices to the first virtual desktop, and user authentication is not required to connect each of the plurality of client devices to the second virtual desktop.

8. A computing device, comprising:
at least one processor; and
memory including instructions that, when executed by the at least one processor, cause the computing device to perform the steps of:
establishing a first collaborative virtual desktop session for a plurality of client devices on a first virtual desktop executing on a server by, for each client device in the plurality of client devices:
connecting via a connection server a virtual desktop client executing on the client device to a first virtual desktop agent of the first virtual desktop and establishing a first remote desktop protocol session between the virtual desktop client and the first virtual desktop, wherein the graphical user interface (GUI) of the first virtual desktop is streamed to the virtual desktop client via the first remote desktop protocol session, and wherein user inputs into the first virtual desktop produced on the virtual desktop client are conveyed by the virtual desktop client to the first virtual desktop agent via the first remote desktop protocol session;
receiving a request at the connection server to switch the collaborative session from the first virtual desktop to a second virtual desktop, the second virtual desktop belonging to a user of a particular client device in the plurality of client devices;
in response to the request, establishing a second collaborative virtual desktop session on the second virtual desktop and switching the plurality of client devices from the first collaborative virtual desktop session to the second collaborative virtual desktop session by:

logging the user into the second virtual desktop; and
for each client device in the plurality of client devices, connecting via the connection server the virtual desktop client executing on the client device to a second virtual desktop agent of the second virtual desktop and establishing a second remote desktop protocol session between the virtual desktop client and the second virtual desktop, wherein the graphical user interface (GUI) of the second virtual desktop is streamed to the virtual desktop client via the second remote desktop protocol session, and wherein user inputs into the second virtual desktop produced on the virtual desktop client are conveyed by the virtual desktop client to the second virtual desktop agent via the second remote desktop protocol session.

9. The computing device of claim 8, wherein the memory further includes instructions that when executed by the at least one processor, cause the computing device to perform the steps of:
receiving a request at the first virtual desktop agent from the particular client device to switch the collaborative session to the second virtual desktop; and
conveying, by the first virtual desktop agent to the connection server, the request to switch the collaborative session to the second virtual desktop.

10. The computing device of claim 8, wherein the memory further includes instructions that when executed by the at least one processor, cause the computing device to perform the steps of:
requesting from the connection server a list of virtual desktops to which the user of the particular client device is entitled; and
receiving, from the particular client device, an election of the second virtual desktop from the list of entitled virtual desktops.

11. The computing device of claim 8, wherein:
mouse and keyboard inputs into the first virtual desktop are permitted from a virtual desktop client selectably designated by an owner of the first virtual desktop as a controlling virtual desktop client not from other virtual desktop clients; and
a request to switch the first virtual desktop to another desktop is only permitted from a controlling virtual desktop client.

12. The computing device of claim 8, wherein the connection server stores a mapping of the first collaborative session on the first virtual desktop, the mapping comprising usernames of users of the virtual desktop clients on the plurality of client devices.

13. The computing device of claim 12, wherein the connecting via the connection server the virtual desktop client executing on the client device to the second virtual desktop agent of the second virtual desktop for each client device in the plurality of client devices is performed by the connection server based on the mapping.

14. The computing device of claim 8, wherein user authentication is required to connect each of the plurality of client devices to the first virtual desktop, and user authentication is not required to connect each of the plurality of client devices to the second virtual desktop.

15. A non-transitory computer readable storage medium comprising one or more sequences of instructions, the instructions when executed by one or more processors causing the one or more processors to execute the operations of:

establishing a first collaborative virtual desktop session for a plurality of client devices on a first virtual desktop executing on a server by, for each client device in the plurality of client devices:
  connecting via a connection server a virtual desktop client executing on the client device to a first virtual desktop agent of the first virtual desktop and establishing a first remote desktop protocol session between the virtual desktop client and the first virtual desktop, wherein the graphical user interface (GUI) of the first virtual desktop is streamed to the virtual desktop client via the first remote desktop protocol session, and wherein user inputs into the first virtual desktop produced on the virtual desktop client are conveyed by the virtual desktop client to the first virtual desktop agent via the first remote desktop protocol session;
receiving a request at the connection server to switch the collaborative session from the first virtual desktop to a second virtual desktop, the second virtual desktop belonging to a user of a particular client device in the plurality of client devices;
in response to the request, establishing a second collaborative virtual desktop session on the second virtual desktop and switching the plurality of client devices from the first collaborative virtual desktop session to the second collaborative virtual desktop session by:
  logging the user into the second virtual desktop; and
  for each client device in the plurality of client devices, connecting via the connection server the virtual desktop client executing on the client device to a second virtual desktop agent of the second virtual desktop and establishing a second remote desktop protocol session between the virtual desktop client and the second virtual desktop, wherein the graphical user interface (GUI) of the second virtual desktop is streamed to the virtual desktop client via the second remote desktop protocol session, and wherein user inputs into the second virtual desktop produced on the virtual desktop client are conveyed by the virtual desktop client to the second virtual desktop agent via the second remote desktop protocol session.

16. The non-transitory computer readable storage medium of claim 15, further comprising instructions that when executed by the one or more processors cause the one or more processors to execute the operations of:
  receiving a request at the first virtual desktop agent from the particular client device to switch the collaborative session to the second virtual desktop; and
  conveying, by the first virtual desktop agent to the connection server, the request to switch the collaborative session to the second virtual desktop.

17. The non-transitory computer readable storage medium of claim 15, further comprising instructions that when executed by the one or more processors cause the one or more processors to execute the operations of:
  requesting from the connection server a list of virtual desktops to which the user of the particular client device is entitled; and
  receiving, from the particular client device, an election of the second virtual desktop from the list of entitled virtual desktops.

18. The non-transitory computer readable storage medium of claim 15, wherein:
  mouse and keyboard inputs into the first virtual desktop are permitted from a virtual desktop client selectably designated by an owner of the first virtual desktop as a controlling virtual desktop client and not from other virtual desktop clients; and
  a request to switch the first virtual desktop to another desktop is only permitted from a controlling virtual desktop client.

19. The non-transitory computer readable storage medium of claim 15, wherein the connection server stores a mapping of the first collaborative session on the first virtual desktop, the mapping comprising usernames of users of the virtual desktop clients on the plurality of client devices.

20. The non-transitory computer readable storage medium of claim 19, wherein the connecting via the connection server the virtual desktop client executing on the client device to the second virtual desktop agent of the second virtual desktop for each client device in the plurality of client devices is performed by the connection server based on the mapping.

* * * * *